United States Patent

Ban et al.

[11] Patent Number: 5,947,107
[45] Date of Patent: Sep. 7, 1999

[54] VISCOUS FLUID TYPE HEAT GENERATOR WITH MEANS ALLOWING IT TO BE MOUNTED IN A SMALL MOUNTING AREA

[75] Inventors: Takashi Ban; Hidefumi Mori; Kiyoshi Yagi, all of Kariya, Japan

[73] Assignee: Kabushiki Kaisha Toyoda Jidoshokki Seisakusho, Kariya, Japan

[21] Appl. No.: 08/868,872

[22] Filed: Jun. 4, 1997

[30] Foreign Application Priority Data

Jun. 4, 1996 [JP] Japan .................................. 8-141942

[51] Int. Cl.[6] ....................................................... F24C 9/00
[52] U.S. Cl. .................. 126/247; 122/26; 237/12.3 R; 237/12.3 B; 123/142.5
[58] Field of Search ........................ 126/247; 123/142.5; 237/1 R, 12.3 R, 12.3 B; 122/26

[56] References Cited

U.S. PATENT DOCUMENTS

| | | | |
|---|---|---|---|
| 3,933,007 | 1/1976 | Eskeli | 126/247 X |
| 4,974,778 | 12/1990 | Bertling | 126/247 X |
| 5,188,090 | 2/1993 | Griggs | 126/247 |
| 5,727,510 | 3/1998 | Ban et al. | 123/142.5 |

FOREIGN PATENT DOCUMENTS

| | | |
|---|---|---|
| 784151 | 7/1997 | Germany . |
| WO9700179 | 12/1996 | WIPO . |

*Primary Examiner*—Larry Jones
*Attorney, Agent, or Firm*—Burgess, Ryan & Wayne

[57] ABSTRACT

A viscous fluid type heat generator including a housing assembly in which a heat generating chamber filled with viscous fluid generating heat due to a shearing action applied thereto, and a heat receiving chamber permitting a heat exchanging liquid to receive heat from the heat generating chamber and to carry the heat to an external heating system, a drive shaft rotatably supported by the housing assembly, and rotating a rotor element mounted thereon to apply the shearing action to the viscous fluid within the heat generating chamber, the drive shaft being provided with front and rear ends axially extending from the front and rear ends of the housing assembly, and having front and rear connecting means by which the drive shaft is connected to two different equipments when the viscous fluid type heat generator is mounted in a space extending between the two different equipments.

7 Claims, 2 Drawing Sheets

VISCOUS FLUID TYPE HEAT GENERATOR WITH MEANS ALLOWING IT TO BE MOUNTED IN A SMALL MOUNTING AREA

BACKGROUND OF THE INVENTION

1. Field of the Invention

The present invention relates generally to a viscous fluid type heat generator in which a viscous fluid is subjected to a repeated shearing action to generate heat which is in turn transmitted to a circulating heat-transfer fluid in a heat receiving chamber, and is carried by the heat-transfer fluid to a desired heated area, such as a passenger compartment in an automobile. More particularly, the present invention relates to a viscous fluid type heat generator having such a construction thereof allowing it to be easily mounted on a small mounting area available in an engine compartment of an automobile.

2. Description of the Related Art

Japanese Unexamined Patent Publication (Kokai) No. 2-246823 (JP-A-2-246823) discloses a typical automobile heating system in which a viscous fluid type heat generator to generate heat is incorporated. The viscous fluid type heat generator disclosed in JP-A-2-246823 includes a pair of mutually opposing front and rear housings tightly secured together by appropriate tightening elements, such as through bolts to define an inner heat generating chamber and a heat receiving chamber arranged adjacent to the heat generating chamber but separated by a partition wall through which the heat is exchanged between the viscous fluid in the heat generating chamber and the water in the heat receiving chamber. The heat exchanging water is introduced into the heat receiving chamber through a water inlet port and delivered from the heat receiving chamber toward an external heating system, and the water is constantly circulated through the heat generator and the external heating system.

A drive shaft is rotatably supported in the front housing via an anti-friction bearing so as to support thereon a rotor element in such a manner that the rotor element is rotated with the drive shaft within the heat generating chamber. The rotor element has outer faces which are face-to-face with the wall faces of the heat generating chamber and form labyrinth grooves therebetween, and a viscous fluid, for example, silicone oil is supplied into the heat generating chamber so as to fill the labyrinth grooves between the rotor and the wall faces of the heating chamber.

When the drive shaft of the viscous fluid type heat generator incorporated in the automobile heating system is driven by an automobile engine, the rotor is also rotated within the heat generating chamber so as to apply a shearing action to the viscous fluid held between the wall surface of the heat generating chamber and the outer surface of the rotor. Thus, the viscous fluid generates heat due to the shearing action. The heat is transmitted to the heat exchanging water flowing through the heat receiving chamber. The heat exchanging water carries the heat to the heating circuit of the automobile heating system Nevertheless, in the above-mentioned viscous fluid type heat generator of JP-A-2-246823, the drive shaft, driven by the car engine to rotate the rotor, has only one end outwardly projecting from one end of the housing of the heat generator, i.e., a rear end of the housing. A front end of the housing is provided with an inlet and an outlet for the heat exchanging liquid. The outwardly projecting end of the drive shaft is used for receiving a drive force from the engine via an appropriate transmission mechanism. Thus, the viscous fluid type heat generator must be mounted in an engine compartment at a location allowing the projecting end of the drive shaft to be operatively engaged with the car engine system. Since the engine compartment is generally narrow, the above-mentioned limit on the location of the viscous fluid type heat generator within the narrow engine compartment makes it difficult to obtain an appropriate mounting area for the viscous fluid type heat generator with respect to various types of automobiles and cars.

Generally, in the engine compartment, auxiliary equipment such as a compressor for a car air-conditioner, a water pump, a hydraulic pump for a power steering system, an alternator, an idler, are mounted therein. Each piece of the auxiliary equipment is arranged to be driven by the car engine through engagement between a common pulley on the engine crank shaft and an individual pulley of the auxiliary equipment via a belt. Therefore, the narrow engine compartment is occupied by these closely mounted auxiliary equipment without leaving any open area. Further, since automobiles must have reduced weight, the compact mounting of the above-mentioned auxiliary equipment becomes an important subject for designing and manufacturing engineers.

In the above-mentioned situation, when it is required to mount the viscous fluid type heat generator of the type as disclosed in JP-A-2-246823 in which the projecting end of the drive shaft of the heat generator, projecting from the rear end of the heat generator housing, supports thereon a hub element of a solenoid clutch for disconnectably connecting the viscous fluid type heat generator to the car engine, the viscous fluid type heat generator must be treated as an additional piece of auxiliary equipment with respect to the various existing auxiliary equipment. Thus, the designing and manufacturing engineers must rearrange the location of the auxiliary equipment mounted in the car engine compartment. This fact obviously brings about an inconvenience in that the automobile body must be re-designed, which causes an unfavorable increase in the manufacturing cost of the automobile.

SUMMARY OF THE INVENTION

Therefore, an object of the present invention is to provide a viscous fluid type heat generator which allows easy mounting of the heat generator within a limited mounting area, especially within an engine compartment of an automobile.

A further object of the present invention is to provide a viscous fluid type heat generator which can be mounted in an automobile engine compartment together with the other various auxiliary equipment without causing an unfavorable alteration in the existing design of the compartment and the auxiliary equipment.

In accordance with the present invention, there is provided a viscous fluid type heat generator which includes a housing assembly defining therein, a heat generating chamber in which heat is generated, and a heat receiving chamber arranged adjacent to the heat generating chamber for permitting a heat exchanging fluid to circulate therethrough to thereby receive heat from the heat generating chamber;

a drive shaft supported by the housing assembly to be rotatable about an axis of rotation thereof, the drive shaft being operationally connected to an external rotation-drive source;

a rotor element mounted to be rotationally driven by the drive shaft for rotation together therewith in the heat generating chamber; and, a viscous fluid, filling a space between an inner surface of the housing assembly defining the heating chamber and an outer surface of the rotor element, for heat generation by the rotation of the rotor element, wherein the drive shaft is provided with axially opposite front and rear ends essentially outwardly extending from the housing assembly in opposite axial directions substantially coinciding with the axis of rotation of the drive shaft, each having a connecting means by which the drive shaft is connected to different equipment.

Preferably, the equipment connected to one of the two axially opposite front and rear ends operatively engages the drive shaft with the external rotation-drive source.

It should be noted that the viscous fluid type heat generator can be connected to two different pieces of equipment (a first and a second piece of equipment) at the axially opposite front and rear ends of the drive shaft via the respective connecting means.

The other equipment refers to one of various equipment except for the viscous fluid type heat generator, and includes one of various auxiliary equipment for an automobile, such as a refrigerant compressor for a car climate control system, a water pump, a hydraulic pump for a power steering system, an alternator, and an idler which are auxiliary used for the operation of the automobile and the car. The other equipment further refers to equipment including a pulley and a solenoid clutch which are used for transmitting a rotation-drive force from the external rotation-drive source to the viscous fluid type heat generator.

The above-mentioned viscous fluid type heat generator can be mounted in a small mounting area available in an area extending between the first and second other equipment, if the small mounting area permits the heat generator to be axially installed therein. Namely, the drive shaft can operate so as to perform a drive force transmitting function in addition to a rotor driving function to drive the rotor element of the heat generator per se.

Thus, the viscous fluid type heat generator can be mounted in a car engine compartment without the necessity of a predetermined mounting area therefore. Accordingly, the mounting of the viscous fluid type heat generator requires neither particular alteration in the designing of the car engine compartment nor an increase in the manufacturing cost for the automobile.

Preferably, the housing assembly of the above described viscous fluid type heat generator includes front and rear housings fluid-tightly combined together. At least one of the front and rear housings includes: a plate element having one end face defining one wall face of the heat generating chamber, and the other end face defining one wall face of the heat receiving chamber; and a main housing portion to which the plate element is tightly attached, the plate member, the main housing portion and the other of the front and rear housings being hermetically secured together with one another in an axial direction parallel to the axis of rotation of the drive shaft.

The above-mentioned axial securing of the front and rear housings of the viscous fluid type heat generator allows a reduction in the entire axial size thereof. Therefore, a mounting area for installing the heat generator can be obtained from a limited area left between the first and second other equipment.

Further, since the plate element and the main housing part of each of the front and rear housings of the housing assembly has a rather simple shape and construction, the assembling of the housing assembly can be easily completed, and therefore, a reduction in the manufacturing cost of the viscous fluid type heat generator can be achieved.

Preferably, an inlet port, for the introduction of the heat exchanging fluid into the heat receiving chamber, and an outlet port, for the delivery of the heat exchanging fluid from the heat receiving chamber toward the heating system, are arranged at the outer circumference of the housing assembly thereof.

The above-mentioned arrangement of the inlet and outlet ports for the heat exchanging fluid allows the viscous fluid type heat generator to be installed between and connected to the first and second other equipment without any mechanical interference between the inlet and outlet ports and the first and second other equipment.

Preferably, the connecting means on at least one of the two axially opposite front and rear ends of the drive shaft comprises a spline formed on one of the front and rear ends of the drive shaft.

The spline on the first and/or second ends of the drive shaft of the viscous fluid type heat generator makes it possible to connect the drive shaft of the heat generator to the first and/or second other equipment via the known spline engagement by simply axially approaching the first and/or second equipments towards the axially opposite drive shaft ends. Thus, the connection by the spline engagement is preferred, compared with a connection by using a screw bolt or by using a key element.

Preferably, the drive shaft is arranged to extend through the heat generating chamber so that the two portions of the drive shaft located on both axial sides of the heat generating chamber are supported by individual bearing devices and individual shaft sealing devices. The bearing devices arranged on the two axially spaced portions of the drive shaft ensure a stable support of the drive shaft of the viscous fluid type heat generator. Namely, unfavorable play of the drive shaft during the rotation thereof can be prevented by the two spaced bearing devices.

Further, in the viscous fluid type heat generator, viscous fluid which generally consists of a viscous liquid such as silicone oil is held between the wall faces of the heat generating chamber and the outer faces of the rotor element. The viscous liquid often cannot be a lubricant, and therefore, provision of the shaft sealing devices on both sides of the heat generating chamber is indispensable for preventing leakage of the viscous liquid from the heat generating chamber toward the bearing devices, and as a result, to prevent the bearing devices from receiving any adverse affect on their lubricating ability. Thus, the provision of the shaft sealing devices and bearing devices on both sides with respect to the heat generating chamber of the viscous fluid type heat generator is advantageous.

BRIEF DESCRIPTION OF THE DRAWINGS

The above and other objects, features and advantages of the present invention will be made more apparent from the ensuing description of typical preferred embodiments thereof with reference to the accompanying drawings wherein.

DESCRIPTION OF THE PREFERRED EMBODIMENTS

Figure 1:
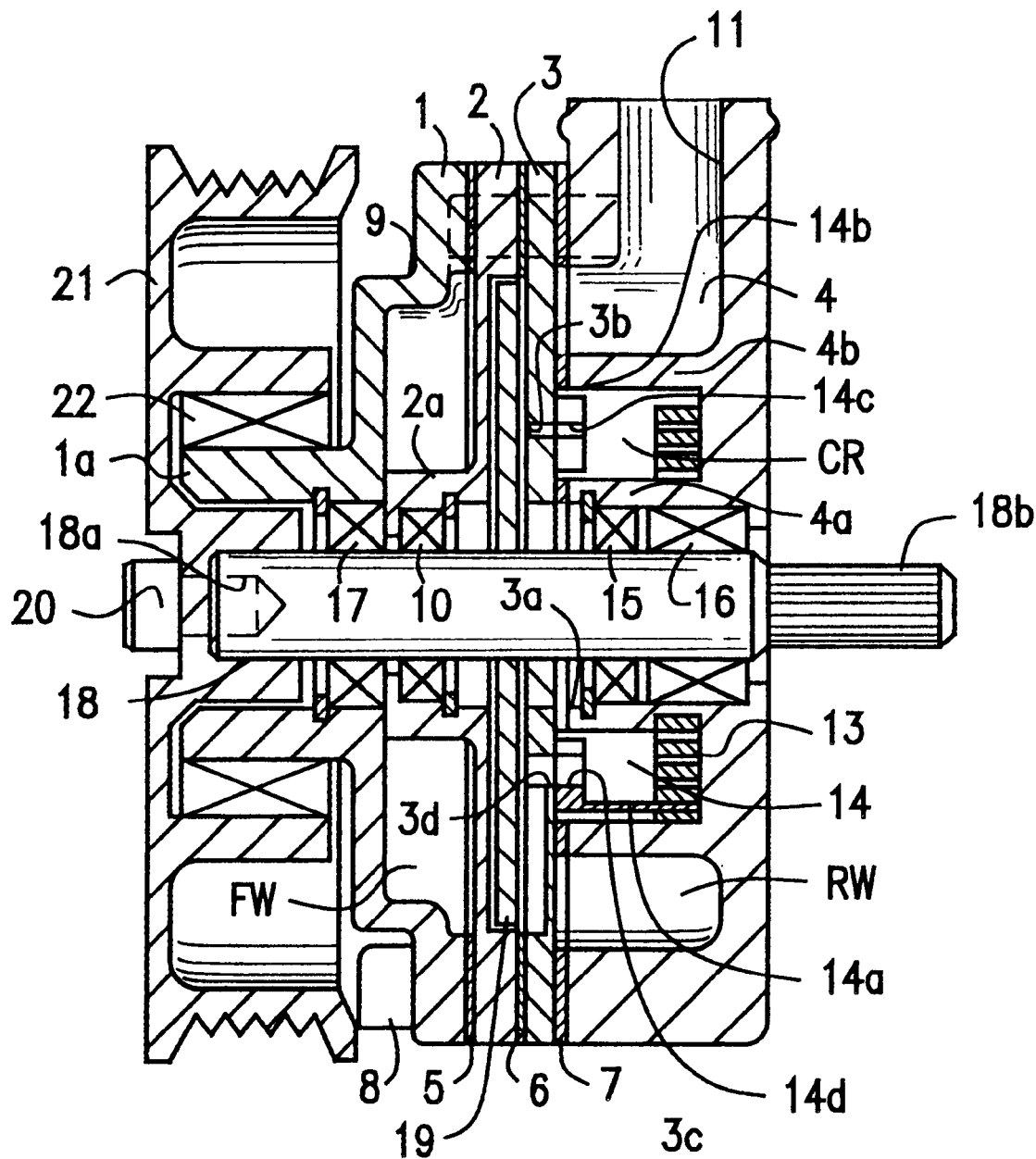
FIG. 1 is a longitudinal cross-sectional view of a viscous fluid type heat generator according to a first embodiment of the present invention.

Referring to FIG. 1, a viscous fluid type heat generator which is constructed as a variable heat-generating performance viscous fluid type heat generator, includes a housing assembly including a front housing body 1, a front plate element 2, a rear plate element 3, and a rear housing body 4 which are arranged in a juxtaposition and combined together by a plurality of screw bolts 8. Gasket elements 5 through 7 are interposed between the front housing body 1 and the front plate 2, the front plate element 2 and the rear plate element 3, and the rear plate element 3 and the rear housing body 4, to hermetically seal the connecting portions. The housing assembly has a front housing portion and a rear housing portion. The front plate element 2 is provided with a rear end face in which an annular recess is formed so as to cooperate with a flat front end face of the rear plate element 3 in defining a heating chamber 9. The rear end face of the front plate element 2 and the front end face of the rear plate element 3 axially oppose one another via the heating chamber 9. The Front plate element 2 is provided with a boss portion 2a for housing a shaft sealing device 10 therein. The rear plate element 3 is centrally provided with a through bore 3a having a diameter corresponding to an inner diameter of the boss portion 2a of the front plate element 2. The rear plate element 3 is also provided with a through hole 3b located radially and upwardly away from the central through bore 3a. The through hole 3b is arranged as a first withdrawing hole for withdrawing the viscous fluid from the heat generating chamber 9 toward a later-described control chamber CR. The rear plate element 3 is further provided with a radial fluid supply groove 3c formed in the front end face thereof. The supply groove 3c extends from a position located radially far below the central bore 3a to a position adjacent to a bottom portion of the heat generating chamber 9, and fluidly communicates with a first fluid supply port 3d in the form of a through hole formed in the front end face of the rear plate element 3 at a position adjacent to the radially innermost end of the radial fluid supply slit 3c.

The front housing body 1 is provided with an inner recess, formed in an inner face thereof, cooperating with a front end face of the front plate element 2 to define a front heat receiving chamber FW arranged adjacent to the heat generating chamber 9.

The rear housing body 4 is internally provided with radially inner and outer ribs 4a and 4b extending annularly and projecting axially toward the gasket 7 so as to be tightly engaged with the gasket 7. A portion of the inner face of the rear housing body 4 located radially outside the outer rib 4b and a portion of the rear end face of the rear plate element 3 defines a rear heat receiving chamber RW which is arranged adjacent to the heat generating chamber 9. A further portion of the inner face of the rear housing body 4, located between the inner and outer ribs 4a and 4b of the rear housing body 4 cooperates with a radially inner portion of the rear end face of the rear plate element 3 to define a control chamber CR which may act as a viscous fluid storing chamber when the viscous fluid is withdrawn from the heat generating chamber 9 into the control chamber CR.

The rear housing body 4 is provided with a circumference in which an inlet port 11 for introducing heat exchanging liquid into the front and rear heat receiving chambers FW and RW, and an outlet port (not shown) for delivering the heat exchanging liquid from the heat receiving chambers FW and RW toward the external heating system are defined. It should be understood that the outlet port is arranged circumferentially adjacent to the inlet port 11. Thus, as is understood from FIG. 1, since the inlet port 11 and the outlet port are formed to be directed radially inward from the outer circumference of the rear housing body 4, the entire axial length of the housing assembly can be short compared with the conventional viscous fluid type heat generator having axially projecting inlet and outlet ports.

The inlet port 11 and the outlet port (not shown) fluidly communicate with the front and rear heat receiving chambers FW and RW.

A plurality of equiangularly arranged passageways 12 are formed in outer peripheral portions of the front and rear plate elements 2 and 3, and a radially outer portion of the inner end face of the front housing body 1, so as to provide a fluid communication between the front and rear heat receiving chambers FW and RW. Two neighboring passageways 12 are arranged circumferentially on both sides of one of the bolts 8 axially tightly combining the front housing body 1, the front plate element 2, the rear plate element 3 and the rear housing body 4 of the housing assembly.

Within the control chamber CR of the rear housing body 4, a bimetal-spring-coil 13, i.e., a thermo-sensitive actuator, is attached to a closed end of the control chamber CR so as to surround a base portion of the annularly extending inner rib 4a. Namely, one end of the coil 13 is attached to the inner rib 4a, and the other end of the bimetal-spring-coil 13 is fixed to an arm portion 14a of a valve element 14 arranged adjacent to the rear end face of the rear plate element 3. The bimetal-spring-coil 13 is provided so as to spirally move from a predetermined position set for a predetermined temperature which is set as a reference temperature for heating an objective heated area in response to an excessive increase or decrease in the temperature thereof from the predetermined temperature.

The valve element 14 is provided with a ring-form rotary valve 14b formed to be integral with the arm 14a. Thus, the rotary valve 14b is rotated about the center of the inner rib 4a by the act of the bimetal-spring-coil 13, via the arm 14a. Nevertheless, the rotary valve 14b of the valve element 14 is constantly urged toward a predetermined position where the rotary valve 14b closes the openings of the first withdrawing hole 3b and the first fluid supply port 3d within the control chamber CR. The rotary valve 14b is provided with a second fluid withdrawing hole 14c which can come into communication with the first withdrawing hole 3b when the rotary valve 14b is rotated from the above-mentioned predetermined position. The rotary valve 14b is also provided with a second fluid supply hole 14d which communicates with the first fluid supply port 3d when the rotary valve 14b is rotated from the predetermined position.

The inner rib 4a of the rear housing body 4 houses a rear shaft sealing device 15 and a rear bearing device 16 supporting a rear portion of the drive shaft 18.

The front housing body 1 is provided with an axially outwardly projecting boss portion 1a which houses a front bearing device 17 supporting a front portion of the drive shaft 18. Namely, the drive shaft 18 is rotatably supported by the front and rear bearing devices 17 and 16 and by the front and rear shaft sealing devices 10 and 15.

On a central portion of the drive shaft 18 is fixedly mounted a rotor element 19 in the form of a planar disc-like element to be rotated together with the drive shaft 18 within the heat generating chamber 9. The outer surface of the rotor element 19 and the inner walls of the heat generating chamber 9 form a gap filled with the viscous fluid, e.g., silicone oil.

It should be noted that the drive shaft 18 is provided with front and rear ends axially extending outward from the front and rear ends of the housing assembly. Namely, the front end of the drive shaft 18 extends outward from the main portion of the front housing body 1 although it is surrounded by the boss portion 1a of the front housing body 1. The rear end of the drive shaft 18 is projected outward from the end face of the rear housing body 4.

The front end of the drive shaft 18 is provided with a threaded hole 18a in which a screw bolt 20 is threadedly engaged to connect another equipment such as a pulley element 21, to the drive shaft 18. The threaded hole 18a of the drive shaft 18 forms a front connecting means. The rear end of the drive shaft 18 is provided with an external spline 18b which may be a rear connecting means to provide a mechanical connection between the drive shaft 18 and another equipment.

When the above-described viscous fluid type heat generator is mounted in a mounting area of an automobile engine compartment, if there is a space in which the heat generator can be positioned in such a posture that the drive shaft 18 having the front and rear ends thereof extends through the space, the space can be used as a mounting area for the viscous fluid type heat generator. For example, if it is possible to attach the pulley 21 (a first different equipment) to the front end of the drive shaft 21 via a bearing device 22 by the threaded engagement of the threaded hole 18a and the screw bolt 20, and to attach an end of the drive shaft of a refrigerant compressor (a second different equipment) of a climate control system by the outer and inner spline connection, the heat generator can be mounted in a small space extending between the pulley 21 and the refrigerant compressor. At this stage, the outer and inner spline connection between the rear end of the drive shaft 18 of the heat generator and the drive shaft of the refrigerant compressor can be easily obtained by mutually moving the heat generator and the refrigerant compressor toward one another. Therefore, the viscous fluid type heat generator according to the first embodiment of the present invention can be mounted in a small mounting area without causing a large change in the design or construction of certain equipment on the automobile body. Accordingly, an increase in the manufacturing cost of an automobile accommodating therein the viscous fluid type heat generator can be appreciably reduced.

Further, it should be appreciated that since the housing assembly of the viscous fluid type heat generator is assembled by only combining the front house body 1, the front plate element 2, the rear plate element 3, and the rear housing body 4 in an axial direction parallel with the axis of rotation of the drive shaft 18, by using a plurality of screw bolts 8, the entire axial length of the heat generator can be reduced, and the employment of the flat-disk-shape rotor element 19 additionally contributes to a reduction in the axial dimension of the heat generator. Thus, not only a reduction in the assembling cost of the heat generator can be achieved but also a mounting area permitting the viscous fluid type heat generator to be positioned between two different equipment such as the pulley 21 and the refrigerant compressor of the climate control system can be easily acquired in a narrow space in an engine compartment of an automobile.

The arrangement of the inlet port 11 and the neighboring outlet port for circulating the heat exchanging liquid in the circumference of the housing assembly of the viscous fluid type heat generator is advantageous for simplifying the positioning operation of the heat generator between two different types of equipment.

When the above-mentioned viscous fluid type heat generator is incorporated in a car heating system, the drive shaft 18 of the heat generator is rotationally driven by a car engine via the pulley 21 and a belt. Therefore, the rotor element 19 is rotated in the heat generating chamber 9 to apply a shearing force to the viscous fluid, i.e., the silicone oil. As a result, the viscous fluid generates heat between the wall of the heat generating chamber 9 and the outer surface of the rotor element 19. Then, the heat is transmitted to the heat exchanging liquid which flows through the front and rear heat receiving chambers FW and RW, and circulates through the heating circuit of the heating system. Therefore, an objective heated area, e.g., a passenger compartment, can be heated.

During the operation of the viscous fluid type heat generator of the first embodiment, the viscous fluid (silicone oil) within the heat generating chamber 9 generally collects toward the central portion of the chamber 9 due to the Weissenberg Effect. Thus, when the temperature of the silicone oil in the control chamber CR is lower than the predetermined reference temperatures the bimetal-coil-spring 13 rotates the rotary valve 14b of the valve element 14 to a position where the first fluid withdrawing hole 3b is not in registration with the second fluid withdrawing hole 14c of the rotary valve 14b but the first fluid supply port 3d is in registration with the second fluid supply hole 14d of the rotary valve 14b. Therefore, the silicone oil within the heat generating chamber 9 is not withdrawn therefrom into the control chamber CR. On the other hand, a supplementary amount of the silicone oil is supplied from the control chamber CR into the heat generating chamber 9 through the second fluid supply hole 14d, the first fluid supply port 3d, and the radial fluid supply groove 3c.

When the supplementary silicone oil is supplied from the control chamber CR into the heat generating chamber 9, the heat generation within the heating chamber 9 increases. Therefore, the viscous fluid type heat generator increases its heat-generation performance, and accordingly, the automobile heating system can increase its heat output.

On the other hand, when the temperature of the silicone oil within the control chamber CR is higher than the predetermined reference temperature indicating that heat application by the automobile heating system to the heated area is in excess, the bimetal-coil-spring 13 reversely rotates the rotary valve 14b of the valve element 14 to the position where the first fluid withdrawing hole 3b and the second fluid withdrawing hole 14c of the rotary valve 14b are in registration with one another, but the first fluid supply port 3d of the heat generating chamber 9 is not in registration with the second fluid supply hole 14d of the rotary valve 14b. Therefore, the viscous fluid, i.e., the silicone oil within the heat generating chamber 9 is withdrawn from the chamber 9 into the control chamber CR through the first fluid withdrawing hole 3b and the second fluid withdrawing hole 14c. As a result, the amount of the silicone oil confined within the heat generating chamber 9 is reduced, and accordingly, a reduction of heat-generation within the heat generating chamber 9 occurs. Thus, the viscous fluid type heat generator can reduce its heat-generating performance so as to reduce the heating function of the automobile heating system. Accordingly, the viscous fluid type heat generator of the first embodiment can easily but accurately control its heat generating function by controlling the amount of the viscous fluid, i.e., the silicone oil, within the heat generating chamber 9.

It should be appreciated that during the operation of the heat generator, the drive shaft 18 is stably rotatably supported by the axially spaced front and rear bearing devices 17 and 16. Thus, the rotation of the drive shaft 18 does not cause any uncontrolled play while ensuring a smooth rotation of the rotor element 19. Further, the shaft sealing devices 10 and 15 arranged between the heating chamber 9 and the front and rear bearing devices 17 and 16 can surely prevent leakage of the viscous fluid from the heating chamber 9 toward the front and rear bearing devices 17 and 16. Therefore, a long operational life of the bearing devices 16 and 17 can be ensured.

Figure 2:
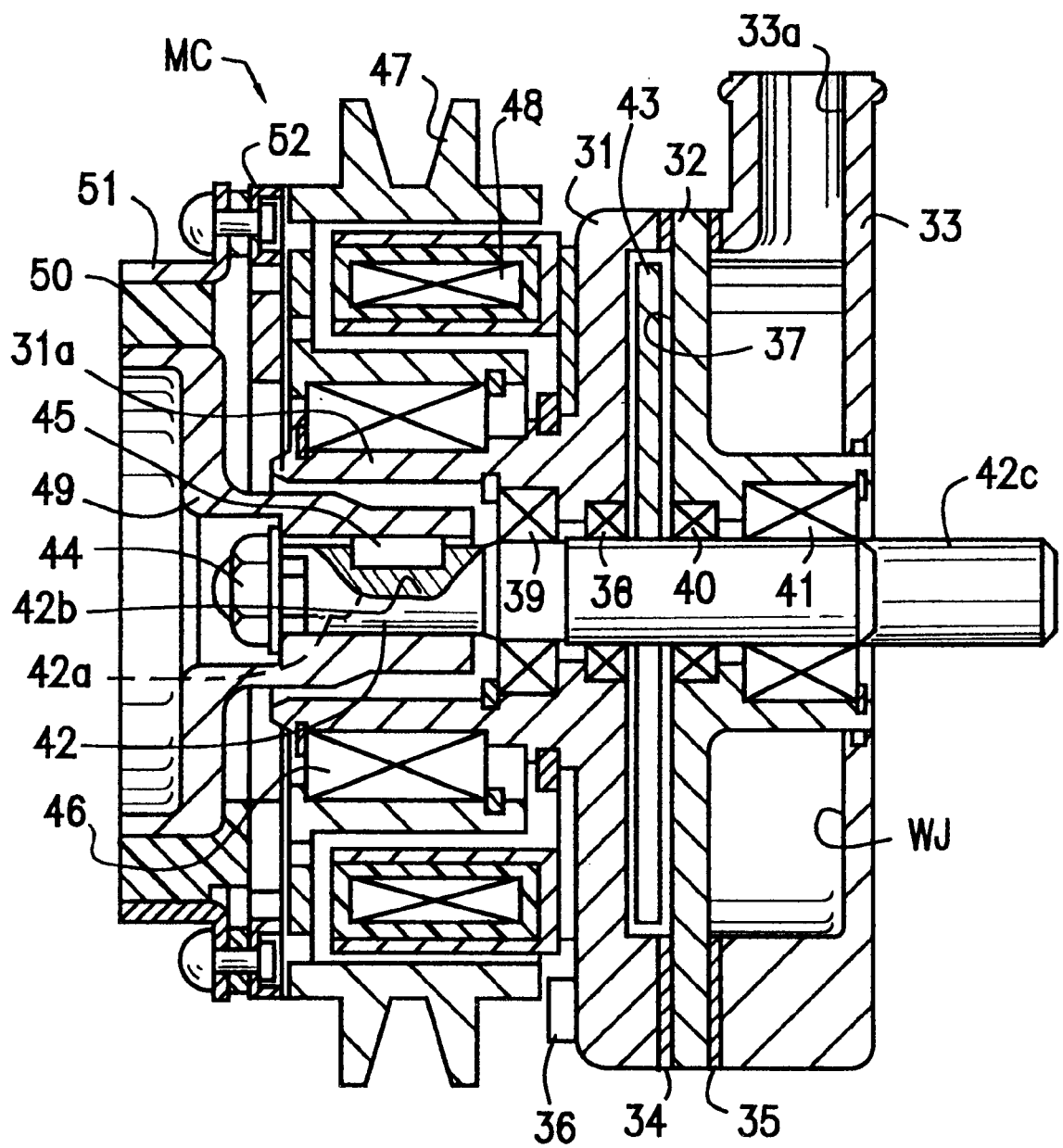
FIG. 2 is a longitudinal cross-sectional view of a viscous fluid type heat generator according to a second embodiment of the present invention.

FIG. 2 illustrates a viscous fluid type heat generator according to a second embodiment of the present invention.

Referring to FIG. 2, the viscous fluid type heat generator is provided with a front housing body 31, a rear plate element 32, and a rear housing body 33 which are juxtaposed and fluid-tightly combined together by a plurality of screw bolts 36 via gaskets 34 and 35. Namely, a housing assembly is formed by a front housing body 31 and a rear housing portion including the rear plate element 32 and the rear housing body 33.

The front housing body 31 is provided with a recess formed in an inner face thereof and facing a front face of the rear plate element 32. Therefore, the recess of the front housing body 31 and the front face of the rear plate element 32 define a closed heat generating chamber 37. The rear face of the rear plate element 32 and the inner face of the rear housing body 33 define a heat receiving chamber WJ which is arranged adjacent to the above-mentioned heat generating chamber 37. The rear housing body 33 of the housing assembly is provided with an outer circumference in which an inlet port 33a and an outlet port (not shown in FIG. 2), which communicate with the heat receiving chamber WJ, are provided.

The front housing body 31 houses a front shaft sealing device 38 positioned adjacent to the heat generating chamber 37 to prevent leakage of viscous fluid from the heat generating chamber 37. The front housing body 31 is centrally provided with an axially extending boss portion 31a which houses a front bearing device 39.

The rear housing body 33 houses a shaft sealing device 40 positioned adjacent to the heat generating chamber 37, and a rear bearing device 41. The front bearing device 39, the front shaft sealing device 38, the rear shaft sealing device 40, and the rear bearing device 41 rotatably and stably support a drive shaft 42. Namely, the rotation of the drive shaft 42 about an axis of rotation thereof occurs without an uncontrolled play.

A rotor element 43 is fixedly mounted on a central portion of the drive shaft 42 so as to be rotated together within the heat generating chamber 37. The rotor element 43 is formed as a flat disk having an outer surface thereof facing an inner wall of the heat generating chamber 37 via gaps. The gaps between the inner wall of the heat generating chamber 37 and the outer surface of the rotor element 43 are filled with the viscous fluid, e.g., a silicone oil.

The drive shaft 42 has front and rear axial ends. The axial ends of the drive shaft 42 outwardly extend beyond the front housing body 31 and the rear housing body 33 of the housing assembly.

The front end of the drive shaft 42 is provided with an axial and threaded hole 42a for threadedly receiving a screw bolt 44, and a key groove 42b formed in the outer circumference thereof for a key 45. Namely, the threaded hole 42a, and the key groove 42b form a front connecting means.

The rear end of the drive shaft 42 is provided with an outer spline 42c formed on the outer circumference thereof so as to be engageable with an inner spline formed in an end of a shaft member of a different equipment such as a refrigerant compressor. Thus, the outer spline 42c of the rear end of the drive shaft 42 forms a rear connecting means.

In the viscous fluid type heat generator of the second embodiment, a solenoid clutch MC forming one of the different equipment is attached to the front end of the drive shaft. Therefore, if a space can be obtained between the solenoid clutch and a further different equipment such as the refrigerant compressor to arrange the viscous fluid type heat generator therein in such a posture that the drive shaft 42 having the front and rear ends thereof horizontally extends in the space, the heat generator can be mounted in a small mounting area. The solenoid clutch MC is fixed to the front end of the drive shaft 42, and has a clutch rotor 47 rotatably mounted on the boss portion 31a of the front housing body 31 via the bearing device 46, and an excitation coil 48 arranged radially internally with respect to the clutch rotor 47. A hub member 49 is fixedly attached to the front end of the drive shaft 42 by using the screw bolt 44 threadedly engaged in the threaded hole 42a and the key 45 fixed to the key groove 42b of the drive shaft 42. The hub member 49 is fixed to an armature 52 of the solenoid clutch MC via a rubber member 50 and a flange element 51. The solenoid clutch MC as one of the different equipment may be used for connecting the viscous fluid type heat generator to an automobile engine.

The rest of the internal construction of the heat generator of the second embodiment is similar to the viscous fluid type heat generator of the first embodiment. Thus, the viscous fluid type heat generator of the second embodiment can be incorporated in an automobile heating system. Therefore, while the solenoid clutch MC is energized so as to connect the drive shaft 42 of the viscous fluid type heat generator to a car engine, the drive shaft 42 rotates so as to cause a rotation of the rotor element 43 within the heat generating chamber 37. Thus, the viscous fluid in the heat generating chamber 37 generates heat due to the shearing force. The heat is transmitted to the heat exchanging liquid flowing through the heat receiving chamber WJ in the rear housing body 33. Therefore, the heat is carried to the heating circuit of the external automobile heating system.

Since the viscous fluid type heat generator of the second embodiment is assembled to have a construction similar to that of the viscous fluid type heat generator of the first embodiment except for a variable heating performance, the former heat generator may enjoy the same or like advantageous features exhibited by the latter heat generator.

In the described first and second embodiments of the present invention, the pulley 21 is attached to the front end of the drive shaft of the heat generator according to the first embodiment, and the solenoid clutch MC is attached to the front end of the drive shaft of the heat generator according to the second embodiment. Alternately, the front end of the drive shaft of the heat generator according to the first embodiment may be connected to the solenoid clutch MC via which the drive shaft is connected to the car engine. Further, the front end of the drive shaft of the heat generator according to the second embodiment may be connected to the pulley 21 via which the drive shaft is connected to the car engine.

Further, the rear ends of the drive shafts of the viscous fluid type heat generators according to the first and second embodiments may be connected to equipment other than the refrigerant compressor. Namely, the different equipment may be one of a water pump, a hydraulic pump for a car steering system, an alternator, or an idler, which are usually mounted in an engine compartment of an automobile as auxiliary equipment for the automobile.

It should be understood that many and various modifications and variations will occur to persons skilled in the art without departing from the spirit and scope of the present invention as defined by the accompanying claims.

What we claim:

1. A viscous fluid type heat generator comprising:

a housing assembly defining therein a heat generating chamber in which heat is generated and a heat receiving chamber arranged adjacent to said heat generating chamber for permitting a heat exchanging fluid to circulate therethrough to thereby receive heat from said heat generating chamber;

a drive shaft supported by said housing assembly to be rotatable about an axis of rotation thereof, said drive shaft being operationally connected to an external rotation-drive source;

a rotor element mounted to be rotationally driven by said drive shaft for rotation together therewith in said heat generating chamber; and, a viscous fluid, filling a space between an inner surface of said housing assembly defining said heat generating chamber and an outer surface of said rotor element, for generating heat by the rotation of said rotor element, wherein said drive shaft is provided with two axially opposite front and rear ends essentially outwardly extending from said housing assembly in opposite axial directions substantially coinciding with the axis of rotation of said drive shaft, each having a connecting means by which said drive shaft is connected to different equipment, and wherein said housing assembly further defines a heat generation controlling chamber therein arranged axially adjacent to said heat generating chamber and provided to communicate with said heat generating chamber so that said viscous fluid within said heat generating chamber is permitted to flow from said controlling chamber toward said heat generating chamber and vice versa in response to a change in a temperature of said viscous fluid within said heat generation controlling chamber.

2. A viscous fluid type heat generator according to claim 1, wherein said different equipment connected to one of said two axially opposite front and rear ends operatively engages said drive shaft with said external rotation-drive source.

3. A viscous fluid type heat generator according to claim 1, wherein said housing assembly comprises front and rear housings fluid-tightly combined together, at least one of said front and rear housings includes;

a plate element having one end face defining one wall face of said heat generating chamber, and the other end face defining one wall face of said heat receiving chamber; and a main housing portion to which said plate element is tightly attached, said plate element, said main housing portion and said other of said front and rear housings being hermetically secured together in an axial direction parallel to the axis of rotation of said drive shaft.

4. A viscous fluid type heat generator according to claim 1, wherein an inlet port for introduction of said heat exchanging fluid into said heat receiving chamber, and an outlet port for delivering said heat exchanging fluid from said heat receiving chamber toward an external heating system are arranged at an outer circumference of said housing assembly thereof.

5. A viscous fluid type heat generator according to claim 1, wherein said connecting means on at least one of said two axially opposite front and rear ends of said drive shaft comprises a spline formed in one of said front and rear ends of said drive shaft.

6. A viscous fluid type heat generator according to claim 5, wherein said spline of one of said front and rear ends of said drive shaft is an external spline engageable with an internal spline formed in a shaft end portion of said different equipment.

7. A viscous fluid type heat generator according to claim 1, wherein said drive shaft is arranged to extend through said heat generating chamber so that two portions of said drive shaft located on axially both sides of said heat generating chamber are supported by individual bearing devices and individual shaft sealing devices.

* * * * *